UNITED STATES PATENT OFFICE.

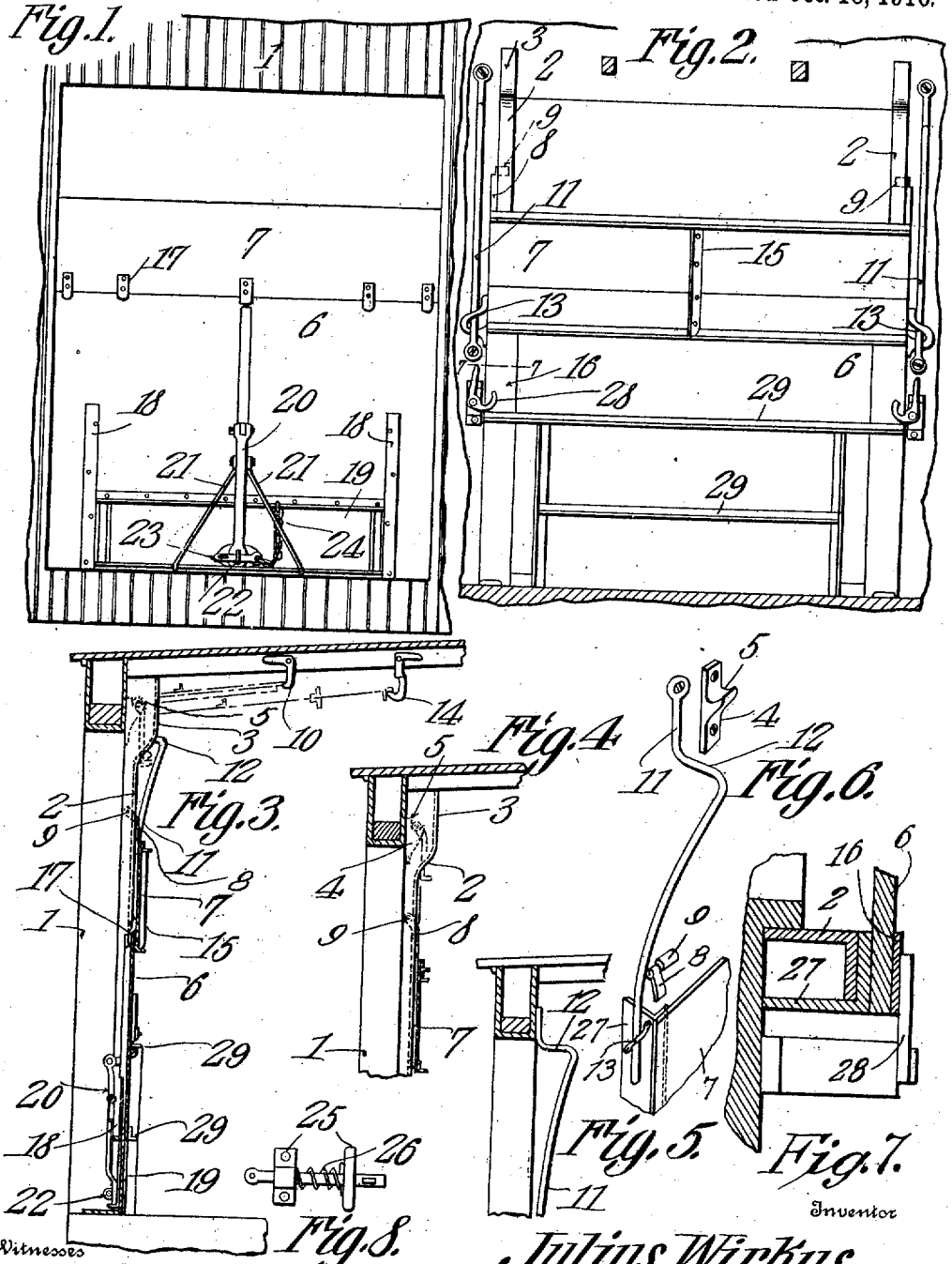

JULIUS WIRKUS, OF MINTO, NORTH DAKOTA.

FREIGHT-CAR DOOR.

973,244.

Specification of Letters Patent. Patented Oct. 18, 1910.

Application filed June 8, 1909. Serial No. 500,807.

*To all whom it may concern:*

Be it known that I, JULIUS WIRKUS, a citizen of the United States, residing at Minto, in the county of Walsh and State of North Dakota, have invented a new and useful Freight-Car Door, of which the following is a specification.

This invention relates to improvements in grain car doors, and consists in certain novel features of construction whereby a simple and strong door is provided which may be readily adjusted to a higher or lower position and by the use of which the loading and unloading of the car will be facilitated as well as leakage of the grain from the loaded car prevented, all of which will be hereinafter more fully set forth.

In the accompanying drawings, Figure 1 is an elevation of my improved door showing the outer side of the same. Fig. 2 is a similar view showing the inner side of the door. Fig. 3 is a vertical section of a portion of a car showing my improved door in position and indicating by dotted lines the position of the door when it is swung upward and supported at the roof of the car so as to facilitate the cleaning and inspection of the car. Figs. 4, 5 and 6 are detail views of parts of the device. Fig. 7 is a horizontal section on the line 7—7 of Fig. 2, and Fig. 8 is a detail view of a slight modification.

The car 1 may be of the usual or any preferred construction and is provided with the usual door opening which in the present case is heavily faced with metal. On the inner side of the car, at the sides of the door opening, I secure metallic track rails 2 which are recessed or grooved in their outer sides and are provided with off-sets 3 in their upper ends, while brackets 4 are secured to the car within the said off-set portions of the track rails, the said brackets being provided with recesses 5 at or near their upper ends, as shown most clearly in Figs. 4 and 6. The track rails 2 extend to the floor of the car, and upon the said rails the door 6 and a panel 7 are arranged to slide. The panel 7 is provided on its upper edge, at its ends, with upstanding arms 8, which are provided at their upper ends with inwardly projecting lugs or rollers 9 which engage the recesses or grooved faces of the track rails so as to guide the panel in its vertical movement. When the panel is moved to the extreme upper limit of its movement, the lugs 9 will ride outward in the off-sets 3 so as to pass above the brackets 4 and the panel may then be pushed bodily outward so as to bring the lugs or rollers 9 into engagement with the recess 5 in the said brackets whereupon the panel may be swung upward upon the said lugs as pivots to the position shown in dotted lines in Fig. 3, in which position it may be supported by hooks 10 suspended from the roof of the car. Adjacent to the track rails and parallel with the same are guide rods 11 which are provided with horizontal shoulders 12 near their upper ends and below the said shoulders are curved inward to the side of the car, as shown most clearly in Figs. 3 and 6.

The door 6 is provided on its sides at or near its upper end with loops or rings 13 which pass around the guide rods in an oblique plane and thereby serve to guide the door in its vertical movements, the arrangement being such that as the door moves upward the curved portion of the guide rod will act on the loops or rings so as to move the door outward slightly from the side of the car, after which the loops or rings may be brought into engagement with the horizontal shoulders 12 of the guide rod and thereby support the door in its elevated position. Should it be desired, however, to entirely clear the door opening, the door may be swung upon the shoulder 12 by means of a loop 13 as though it were hinged and swung up into the position shown in dotted lines in Fig. 3 where it may be supported by hooks 14 depending from the car roof.

The panel 7 is reinforced on its inner side by angle irons 15 and the door 6 is faced at its side edges with metallic strips 16 so as to impart great strength to the structure and also prevent driving of nails or similar devices into the door or the door frame. The panel is furthermore provided on its outer face near its lower edge with lips or hooks 17 which are adapted to engage over the upper edge of the door when the panel is lowered so as to properly position the panel with respect to the door and prevent the panel dropping entirely below the upper edge of the door. It will be understood also that the edge of the panel will be slightly below the upper edge of the door when the panel is lowered so that leakage of the grain over the edge of the door will be prevented.

The door is provided in its lower edge with a suitable discharge opening, and on its outer face, at the ends of the said discharge opening, cleats or guide strips 18 are secured to guide and support a gate 19 which is slidably mounted between the said cleats and the side of the door. Above the discharge opening, a lever 20 is fulcrumed to the door, and this lever is connected by links 21 with the lower edge of the gate so that when the lever is swung up or down the gate will be raised or lowered. The gate carries a keeper 22 and the lever is provided at its free end with an eye adapted to engage over the said keeper. When the gate is lowered so as to close the discharge opening, the lever is engaged over the keeper and a key 23 is inserted through the keeper over the end of the lever, and the usual seal is attached to the end of the said key. In Fig. 1 I have shown the key as attached to the gate by means of a chain 24, but the device shown in Fig. 8 may be employed if preferred. In the said Fig. 8, the key is mounted in keepers or guides 25 on the gate and is held normally in its locking position by a spring 26. In order to further guard against leakage, and to guide the door in its movement, so as to prevent swaying of the same, I secure to the outer face of the door beyond the track rails 2, angle irons 27 which bear against the outer sides of the track rails and are also adapted to bear against the side of the car.

Fastening devices which, in the present embodiment of the invention, are in the form of cam levers 28, are mounted on the side of the car adjacent the side edges of the door and are adapted to be turned over the said side edges of the door, as shown in Fig. 2, so as to hold the door firmly to the track rails and thereby hold the angle irons or flanges on the outer faces of the door firmly against the track rails, and the side of the car, so that no open joints will be left along the sides of the door frame to permit leakage of the grain. The door and the gate are reinforced by means of suitable angle irons 29 so that the structure will possess a high degree of rigidity.

From the foregoing description it will be seen that I have provided a car door of great strength, which can be easily operated for the purpose of loading or unloading the car, which will effectually prevent tampering with the contents of the car, and will also guard against leakage and loss of the freight.

Having thus described my invention, what I claim is:

The combination with a car structure having a door opening and rails secured to the structure at opposite sides of the opening, each of said rails having a longitudinal recess in that face thereof farthest removed from the opening, the upper end portion of each recess being enlarged, of a door consisting of upper and lower sections, angle irons thereon and slidably mounted on the rails and lapping the recessed faces thereof, upstanding arms upon the upper section of the door, rollers carried thereby and movable within the recesses, upwardly curved guide rods secured to the car structure and adjacent the rails, means attached to the angle irons of the lower door section and slidably mounted upon said curved guide rods, there being intermediate shoulders formed by the guide rods, and said means being movable onto the shoulders of the rods, and means upon the car structure for engaging the lower section of the door to support it in elevated position when said engaging means are located above the shoulders on the rods.

In testimony that I claim the foregoing as my own, I have hereto affixed my signature in the presence of two witnesses.

JULIUS WIRKUS.

Witnesses:
H. C. DE PUY,
M. S. FEDJE.